(12) United States Patent
Dixit et al.

(10) Patent No.: US 12,072,969 B2
(45) Date of Patent: Aug. 27, 2024

(54) PERSONALIZED PASSWORD PROMPTING SYSTEM

(71) Applicant: KYNDRYL, INC., New York, NY (US)

(72) Inventors: Archana Dixit, Agra (IN); Amol Bhaskar Mahamuni, Bangalore (IN)

(73) Assignee: Kyndryl, Inc., New York, NY (US)

( * ) Notice: Subject to any disclaimer, the term of this patent is extended or adjusted under 35 U.S.C. 154(b) by 369 days.

(21) Appl. No.: 17/353,904

(22) Filed: Jun. 22, 2021

(65) Prior Publication Data

US 2022/0405379 A1 Dec. 22, 2022

(51) Int. Cl.
  *G06F 21/45* (2013.01)
  *G06F 21/31* (2013.01)

(52) U.S. Cl.
  CPC .............. *G06F 21/45* (2013.01); *G06F 21/31* (2013.01)

(58) Field of Classification Search
  CPC ................................. G06F 21/45; G06F 21/31
  USPC ............................................................ 726/18
  See application file for complete search history.

(56) References Cited

U.S. PATENT DOCUMENTS

| 8,812,319 B2 | 8/2014 | Skerpac | |
| 10,333,943 B2 | 6/2019 | Childress | |
| 10,334,439 B2 * | 6/2019 | Verma | H04L 63/08 |
| 10,423,775 B1 * | 9/2019 | Kane-Parry | G06F 21/46 |
| 10,586,036 B2 * | 3/2020 | Turgeman | G06F 21/316 |
| 2016/0112437 A1 | 4/2016 | Churyumov | |
| 2016/0352732 A1 * | 12/2016 | Bamasag | H04W 4/70 |
| 2018/0189470 A1 * | 7/2018 | Kim | G06F 21/316 |
| 2020/0251118 A1 | 8/2020 | Sunkavally | |
| 2020/0259657 A1 | 8/2020 | Grajek | |

OTHER PUBLICATIONS

Anonymous. "Internet of Things—Data Security and User Authentication Management." Published Jun. 14, 2018. 12 pages. Published by IP.com. https://priorart.ip.com/IPCOM/000254267D.

Ashibani, et al., "Design and Implementation of a Contextual-Based Continuous Authentication Framework for Smart Homes." Published Jan. 17, 2019. 20 pages. In Appl. Syst. Innov. 2019, 2(1), 4. Published by MDPI. https://doi.org/10.3390/asi2010004.

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Kambiz Zand
*Assistant Examiner* — Phuc Pham
(74) *Attorney, Agent, or Firm* — Dan Housley; Andrew M. Calderon; Calderon Safran & Wright P.C.

(57) ABSTRACT

A processor may receive authentication data related to inputs of a user to predetermined authentication prompts. The processor may select devices from a set of registered devices to use for providing a first password prompt to the user. The processor may identify one or more output formats for each of the selected devices. The processor may generate a first password prompt having two or more password prompt components, where each password prompt component has an output format. The processor may send the two or more password prompt components to respective selected devices.

20 Claims, 5 Drawing Sheets

(56) References Cited

OTHER PUBLICATIONS

Nespoli, et al., "PALOT: Profiling and Authenticating Users Leveraging Internet of Things." Published Jun. 25, 2019. 26 pages. In Sensors 2019, 19(12), 2832. Published by MDPI. https://doi.org/10.3390/s19122832.

* cited by examiner

PERSONALIZED PASSWORD PROMPTING SYSTEM

BACKGROUND

The present disclosure relates generally to the field of computerized password system, and more specifically to providing personalized password prompts using multiple devices.

Authentication system assist in reducing fraudulent activities and security breaches. Some authentication measures include security tokens, passwords or PINs, fingerprints or retinal patterns. These measures are often based on pre-defined and static data and are prone to multiple threats.

SUMMARY

Embodiments of the present disclosure include a method, computer program product, and system for providing personalized password prompts using multiple devices.

A processor may receive authentication data related to inputs of a user to predetermined authentication prompts. The processor may select devices from a set of registered devices to use for providing a first password prompt to the user. The processor may identify one or more output formats for each of the selected devices. The processor may generate a first password prompt having two or more password prompt components, where each password prompt component has an output format. The processor may send the two or more password prompt components to respective selected devices.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
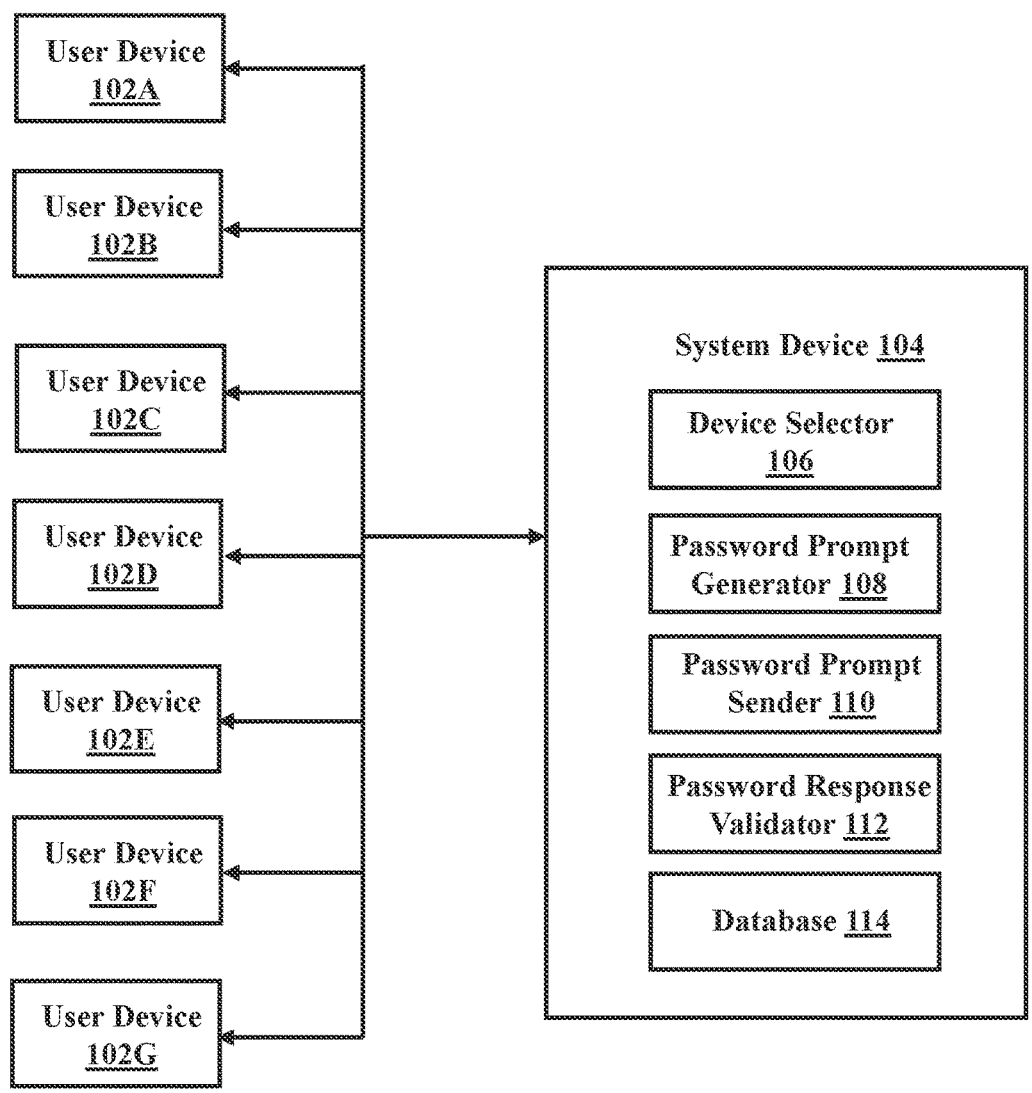
FIG. 1 is a block diagram of an exemplary system for providing personalized password prompts, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computerized password system, and more specifically to providing personalized password prompts using multiple devices. While the present disclosure is not necessarily limited to such applications, various aspects of the disclosure may be appreciated through a discussion of various examples using this context.

In some embodiments, a processor may receive authentication data related to inputs of a user to predetermined authentication prompts. In some embodiments, the authentication data may relate to inputs provided by the user to predetermined prompts (e.g., "list your favorite vacation spots") or questions (e.g., "where did you go on your last vacation"). In some embodiments, the authentication data may relate to answers/responses provided by the user to groups of questions/prompts, where the prompts in each group relate to the same topic. In some embodiments, the authentication data may serve as the corpus of information based on which personalized password prompts may be generated for a user. For example, the groups of questions or prompts may relate to the user's favorite singer, favorite athlete, childhood hero, etc. The prompts or questions in a group (e.g., all related to a topic) may have subtopics that are related to the topic (e.g., various attributes of the favorite singer, such as where she lives, what work is she best known for, what are some of her recent achievements, etc.).

In some embodiments, the processor may be configured to receive inputs from the user to the authentication prompts/questions in varied input formats. For example, the format of the inputs may include text, images (e.g., in response to a question asking for an image of the primary school to which the user went), video (e.g., a video of a portion of a concert of the user's favorite singer), a tactile responses (e.g., in response to a question about how old the user was when she first saw a superman movie, a tactile response where the user taps her finger 10 times to indicate 10 years old), or any combination thereof.

In some embodiments, the processor may select devices from a set of registered devices to use for providing a first password prompt to the user. In some embodiments, the processor may select the devices, at least in part, on the basis of selection criteria. In some embodiments, the selection criteria may relate to the feasibility of selecting/using certain devices or a preference for selecting/using the devices for providing the password prompt to the user. In some embodiments, the selection criteria may include the proximity of a device to the user at the time when a password prompt is intended to be sent, whether the device is operational (e.g., powered on) at the time when a password prompt is intended to be sent, whether the device is connected to the password generation system at the time when a password prompt is intended to be sent, the user's history of usage of the device (e.g., frequency, amount, or timing of usage), other criteria indicating a user's preference for using the device or the feasibility of using the device, or any combination thereof. In some embodiments, the selection criteria may relate to the security level provided by the registered device. For example, a device with a T2 security chip may be selected or a device that has a microphone for voice recognition.

In some embodiments, at the time of registration with the password prompting system, the user may provide a list of the devices that she may want to participate in the system for providing password prompts. In some embodiments, the list may include two or more devices that are connected to the password generation system (e.g., through a platform for internet-of-things "IoT" connected devices). In some embodiments, the password generation system (e.g., on the IoT platform) may have real-time access to each of the devices and may be capable of determining the feasibility of using each of the registered devices in the password prompt system (e.g., operable, connected, and proximate to a user) at a particular time. In some embodiments, the devices that are registered with the password generation system may be discoverable and validated by the password generation system (e.g., securely connected and accessible). In some embodiments, the registered devices may be configured to receive communications from the password generation system in a secure manner.

As an example, a user may have registered ten devices on the password prompting system, and of the ten devices only seven devices may be powered on and connected to (e.g., in communication with) the password generation system at the time when a password prompt is intended to be sent. Only five of the devices may be located in proximity to the user (e.g., within a predefined proximity threshold or meeting certain proximity criteria such as being in the same building/room as the user [geofence]). The processor may select three of these five devices to use for the password prompting process. The three devices may be selected, at least in part, based on selection criteria related to a history of usage or a user's preference for using these devices (e.g., how frequently the three devices are used by the user).

In some embodiments, an artificial intelligence ("AI") model may determine which selection criteria to use for selecting the devices. In some embodiments, the AI model may be trained to pick selection criteria for selecting devices that result in greater effective password validation (e.g., the password response provided by the user in response to the password prompt is valid). In some embodiments, the AI model may be trained to utilize selection criteria that result in a reduction in the number of times/frequency that the a password prompt is resent to a user for the user to make an additional attempt to provide a valid password response (e.g., resending a password prompt component if the user gets 75% of the password correct but not 100%). In some embodiments, the AI model may be a deep learning convolutional neural network.

In some embodiments, the number of devices selected for providing a password prompt to the user may relate to the number of password prompt components of the password prompt generated by the password prompting system. For example, if eight devices meet the selection criteria relating to the feasibility of use of the devices (e.g., based on their operability, proximity, and connection to the system), but there are only three password prompt components, then three or fewer devices may be selected.

In some embodiments, the processor may identify one or more output formats for each of the selected devices. In some embodiments, the processor may determine the various ways (e.g., formats) for the selected devices to provide information to a user, including, for example, text, numbers/digits, voice/audio, haptics (e.g., vibrations), images, video, etc. For example, a cell phone may be capable of providing outputs to a user in formats such as text, video, audio, images, and tactile. A speaker may only be able to provide outputs to a user in an audio format. A smartwatch or fitness tracker with less processing capabilities or less power may be able to provide text, audio, images, and tactile outputs, but not video outputs. In some embodiments, the processor may identify the capabilities of devices registered on the password prompting system regarding formats for outputs prior to the registered devices being selected for use for providing a password prompt to the user.

In some embodiments, the processor may generate a password prompt having two or more password prompt components, where each password prompt component has an output format. In some embodiments, the processor may send the two or more password prompt components to their respective selected devices.

In some embodiments, the password prompt and/or the password prompt components may be cues (e.g., in the form of questions or prompts that the user can interpret and answer) sent to a user to elicit the user to provide a password in response to the password prompt. In some embodiments, the password response to be provided by a user may be a password or a passphrase created by combining responses to each of the password prompt components. For example, the responses to the two or more password prompt components may be combined together by stringing together the responses to the prompt components without any spaces or punctuation between each response to a prompt component.

In some embodiments, the password prompts and/or the password prompt components may be generated based on the authentication data provided by the user. In some embodiments, the password prompt components may be in the form of questions, cues, or prompts related to the authentication data provided by the user. For example, the user may receive the following passphrase prompt components: 1) how old were you when you learned to ride a bicycle (sent as a text message to the user's smartwatch); 2) what building is shown in this picture (where a picture of the city hall building in the user's hometown is sent to the user's tablet); 3) what song is this (where the smart speakers in the user's home plays a clip of a lesser-known song by the user's favorite singer. As another example, the password prompt may instruct the user to add two numbers where three vibrations are sent to a smartwatch and the number five is played auditorily by a connected speaker system.

In some embodiments, the processor may generate the password prompt by selecting how many password prompt components (e.g., segments) the password prompt is to have. In some embodiments, the number of password prompt components may be selected randomly. In some embodiments, the number of password prompt components may be based on the previous password prompts provided by the password prompting system to the same user. For example, the number of password prompt components may be a factor (e.g., attribute of the password prompt) that is to be varied from one password prompting occurrence (e.g., selecting devices, determining output formats, generating a password prompt, and sending password prompt components to their devices) to another.

In some embodiments, the passphrase prompt may be generated by a cognitive system utilizing an artificial intelligence model. The cognitive system may be able to utilize the authentication data as an information corpus from which to generate questions/prompts (e.g., the password prompt components) that are personalized for the user. In some embodiments, the cognitive system may utilize additional information obtained from the usage data from a device of the set of registered devices to generate password prompts. In some embodiments, the cognitive system may generate password prompt components that are based on updated information relating to the topic or subtopic of the authentication data. For example, a password prompt component may ask a user to input the current age of the user's favorite actor. The cognitive system may be able to utilize information regarding the current date to determine the current age of the actor. In some embodiments, the cognitive system may be a deep learning convolutional neural network.

In some embodiments, the processor may identify that the first password prompt is being provided to the user for a heighted security transaction. In some embodiments, the processor may generate the first password prompt to have an increased number of password prompt components. In some embodiments, the number of password prompt components may depend on the type of transaction for which a password is to be entered. In some embodiments, certain transactions for which a password is to be entered may be identified as heightened security transactions for which a password prompt having more password prompt components may be generated. For example, when a user is entering a password for a financial transaction involving 40,000 dollars, the password prompt may have more password prompt components than a password prompt for entering a password for a financial transaction involving 40 dollars.

In some embodiments, if the number of password prompt components exceeds the number of devices selected (e.g., if the number of devices that are connected to password prompting system and operational is less than the number of password prompt components), then multiple password prompt components may be sent to a single device. In some embodiments, each password prompt component may be generated to have an output format that corresponds to a format that the device (to which the password prompt component is sent) is configured to provide to the user (e.g., a question about a video clip may be sent to a smartphone device capable of displaying video clips to a user).

In some embodiments, the processor may receive a first password response having two or more password response components. In some embodiments, the processor may determine whether the first password response is valid, at least in part, based on whether each of the two or more password response components matches respective expected response components.

For example, the user may receive the following passphrase prompt components: 1) how old were you when you learned to ride a bicycle (sent as a text message to the user's smartwatch); 2) what building is shown in this picture (where a picture of the city hall building in the user's hometown is sent to the user's tablet); 3) what song is this (where the smart speakers in the user's home plays a clip of a lesser-known song by the user's favorite singer. The user may input a response into her laptop computer (e.g., the password), where the password is "response to question 1" "response to question 2" "response to question 3". The password response of "10buffalocityhallstrangerinmyownhometown" may be determined to be valid because each password response component "10," "buffalocityhall" and "strangerinmyownhometown" match their respective expected response components, "10" (the response to question 1), "buffalocityhall" (the response to question 2), and "strangerinmyownhometown."

In some embodiments, the password response components may be determined to match their respective expected response components if the entered password response component is identical to the expected response component. In some embodiments, the password response components may be determined to match their respective expected response components if the entered password response component is similar to the expected response component and the similarity exceeds a similarity threshold (e.g., 95% of the inputted characters of the response component are identical to the characters of the expected response).

In some embodiments, by generating the password prompt using information provided in the authentication data, the prompts or questions used to generate the password may be more personalized to the user. The personalized prompts/questions may be less likely to be answerable by someone other than the user (e.g., security breach) because the passwords (e.g., prompts/responses) are being generated on the basis of information that is less well known to another person (e.g., Buffalo city hall may only be identifiable to people who are from Buffalo, or the song "Stranger in My Own Hometown" is less well known than other songs). Additionally, the personalized prompts/questions may be generated on the basis of a large pool of information, the authentication data (rather than answers to a smaller set of questions). In some embodiments, the passwords used by the disclosed system may be more secure because the prompts in response to which the user provides a password (e.g., a unique password each time the user needs to provide a password) are being received on multiple user devices. In some embodiments, the passwords used by the disclosed system may be more secure because the prompts are being provided in multiple formats. In some embodiments, the passwords used by the disclosed system may be more secure because the use of multiple formats to prompt a password input also increases the complexity and specificity of the questions asked of the user for generating the password.

In some embodiments, the processor may identify that at least one of the two or more password response components does not match its respective expected response component. In some embodiments, the processor may determine a percentage of the two or more password response components that match their respective expected response components. In some embodiments, the processor may determine that the percentage exceeds a match threshold. In some embodiments, the processor may generate one or more additional password prompt components. In some embodiments, the processor may send the one or more additional password prompt components to respective selected devices.

For example, in response to a password prompt having four password prompt components, a user may provide a password response having four password response components, each a response to the respective password prompt components. Three of the password response components may match their respective expected response components but one may not. The percentage of the response components that are valid (e.g., match the expected response components), 75%, may exceed a match threshold of 70%. The processor may then generate an additional password prompt component in response to which a user may input/provide an additional password response component. In some embodiments, the additional password response component along with the three matching response components may together make up the valid password response.

In some embodiments, the processor may generate a second password prompt and send two or more second password prompt components to respective selected devices. In some embodiments, the second password prompt may have a security factor that differs from a security factor of the first password prompt. In some embodiments, the processor may select devices to use for providing a second password prompt to the user. In some embodiments, the processor may determine one or more output formats for each of the selected devices. In some embodiments, the processor may generate a second password prompt having two or more second password prompt components. In some embodiments, the processor may send the two or more second password prompt components to their respective selected devices.

In some embodiments, the security factor may be an attribute of a password prompt or one or more of its password prompt components that may vary each time a password prompt is generated (other than the actual question being asked which is already being changed) for further enhancement of the security of the password prompts. For example, security factors that may be varied may include: the number of password prompt components of a password prompt, the number of different devices selected for providing the password prompt to the user, the output format for a password prompt component that a device is to provide to a user, the identity of the device selected for providing a password prompt to the user (e.g., selecting a first tablet from among three tablets registered with the system), the manner in which the user's responses to the password prompt components are to be combined by the user to form the password response (e.g., the order of password prompt components and the order of the responses to the password prompt components based on which the password response is created). In some embodiments, at least one of the security factors may differ each time a new password prompt (e.g., a first password prompt, a second password prompt, etc.) is provided to a user.

In some embodiments, at least one of the two or more password prompt components may be generated based on usage data from one or more devices of the set of registered devices. In some embodiments, the processor may receive authentication data (related to inputs of a user to authentication prompts) that provides the information based on which the password prompts are generated and based on which expected responses are determined. For example, a user may provide authentication data indicating that her favorite singer is Elvis Presly and that her favorite singer's hometown is Memphis, TN One component of the password prompt generated for her may be to name the town where Elvis was raised. This password prompt component may be generated solely on the basis of the authentication data provided by the user regarding the topic of her favorite singer and the subtopic of the hometown of her favorite singer. For example, when the user provided authentication data, the user may have provided information or answers to groups of questions regarding the topic "favorite singer." Each question in the group may also have related to a subtopic, for example: who is your favorite singer (subtopic: identity of favorite singer/object/subject), where did he grow up (subtopic: hometown), what is your favorite song from that singer (subtopic: favorite song), have you seen him live in concert (subtopic: concert), etc.

In some embodiments, at least one of the password prompt components may be generated based on additional information other than the authentication data initially provided by the user. In some embodiments, the additional information may be obtained from usage data from one or more devices of the set of devices that the user registered to be used for the password prompting system. In some embodiments, the usage data may be obtained from how the device was used in a recent time period. For example, a cell phone may have been used in the recent time period to browse the internet, purchase items, etc. In some embodiments, if the cell phone was used in any way that relates to a topic or subtopic related to the authentication data, the additional information obtained from the use (e.g., information obtained from internet browsing data) may be used to generate a password prompt component. For example, usage data may indicate that the user: recently watched a movie featuring a song from her favorite singer, purchased tickets to a concert by her favorite singer, posted a video on social media of her favorite signer singing a particular song, purchased a flight to and hotel room in her favorite singer's hometown, etc. In some embodiments, this additional information may be used to generate one or more password prompt components. In some embodiments, the usage data may relate to the user profile, user behaviour, social media interactions, emails, financial transactions, travel history, mode of transportation, etc. In some embodiments, the usage data may be used to produce a highly complex compounded passphrase, using password prompt components such as "what is the most recent movie you watched," "what is the city you visited last week," or "choose the picture of a restaurant that you dined at last weekend," etc.

For example, the user may have used her cell phone (a registered device) to purchase air fare to and a hotel in Memphis TN Based on this additional information, the system may generate a password prompt component asking her to identify a famous landmark in Memphis TN that is unrelated to Elvis. By learning that the user likely recently went to Memphis TN and that Memphis TN is the hometown of her favorite singer, the system may expect that the user may now recognize the famous landmark in Memphis. Without this additional information, the processor may have generated password prompt components relating to Elvis or relating to Memphis generally. The usage data expands the information available related to topics and/or subtopic related to authentication prompts based on which to generate questions or prompts for the password prompt components. This feature increases the number and complexity of the password prompts that a user may receive and the security of the passwords generated in response to the password prompts. This feature broadens the information based on which the password prompts may be generated and increases the complexity and security of the password generation process.

In some embodiments, the password prompting system may include a cognitive system capable of self-learning. In some embodiments, the cognitive system may be capable of learning from failures of a user to correctly respond to prompts using certain formats. For example, a user may have difficulty responding to prompts that are output to a device in the tactile format (e.g., vibrations), and the cognitive system may be capable of not selecting the tactile format as an output format for the next generated password prompt.

Referring now to FIG. 1, a block diagram of a network 100 for providing personalized password prompts using multiple devices is illustrated. System 100 includes user devices 102A-G and a system device 104. The system device 104 is configured to be in communication with the user devices 102A-G. The system device 104 includes a device selector 106, password prompt generator 108, password prompt sender 110, password response validator 112, and database 114. The database 114 stores the authentication data and usage data from one or more devices. In some embodiments, the user devices 102A-G and the system device 104 may be any devices that contain a processor configured to perform one or more of the functions or steps described in this disclosure. In some embodiments, the user devices 102A-G are computing devices connected in an internet-of-things network.

In some embodiments, a user registers computing devices, user devices 102A-G, for use with the password prompting system. The user also provides authentication data to the system device 104 (e.g., input using one of the user devices 102A-G in communication with the system device 104). When the user needs to input a password when using, for example, a personal computer (e.g., user device 102A), the system device 104 utilizes the device selector 106 to select devices (e.g., user devices 102B-D) from the set of registered devices (e.g., user devices 102A-G) to use for providing a first password prompt to the user. User devices 102B-D may be selected based on their connectivity to the network and proximity to the user. The device selector 106 identifies one or more output formats for each of the selected devices, user devices 102B-D, and communicates the output formats possible for user devices 102B-D to password prompt generator 108. The password prompt generator 108 generates a first password prompt having two or more password prompt components. The password prompt sender 110 sends the two or more password prompt components to respective selected devices, user devices 102B-D. The password prompt components sent to each of the selected devices are provided in formats that the devices are capable of outputting to the user.

The user receives password prompts on user devices 102B-D in a particular order and provides responses to each of those password prompt components through user device 102A (e.g., the user's personal computer) to the system device 104. The system device 104 utilizes the password response validator 112 to determine that the password (e.g., the password made of responses to each of the password prompt components) is valid. The user device 102A is then permitted access to the application, system, location, etc. that it was trying to access through use of a password.

In some embodiments, when the user needs to enter another password, the system device 104 may generate a second password prompt having two or more second password prompt components. The second password prompt may include at least one component that has a security factor that differs from a security factor of the first password prompt (e.g., or its components). For example, a first password prompt may have three components and be sent to three devices. A second password prompt may have four components and be sent to four devices. A third password prompt may have three components and be sent to a set of three devices that differs from the set of three devices to which the first password prompt was sent.

In some embodiments, the system device 104 may identify that a password prompt is being provided to the user for a heightened security transaction. The password prompt generator 108 may generate the password prompt to have an increased number of password prompt components. In some embodiments, the password prompt generator 108 may utilize usage data from one or more devices of the set of registered devices as the information based on which the password prompt components are generated. In some embodiments, the password response validator 112 may identify that at least one of the password response components provided by the user does not match its respective expected response component. In some embodiments, the password response validator 112 may determine a percentage of the two or more password response components that match their respective expected response components and determine that the percentage exceeds a match threshold. The password prompt generator 108 may then generate an additional password prompt component and send the additional password prompt component to a user device (e.g., 102B-D). The user may them receive the additional password prompt component and provide a response to the additional password prompt component as a substitute for the password response component that previously did not match its expected response component.

In some embodiments, all available IoT devices connected to an IoT platform may be analyzed for their device capabilities. The user may then initiate an authentication process. The IoT platform may use artificial intelligence to identify all connected and reachable devices. If only one device is eligible, the artificial intelligence may select an authentication method based on the past history of user behavior. The system may then create the validation method (e.g., password prompt) and split and send the questions to multiple IoT devices.

Figure 2:
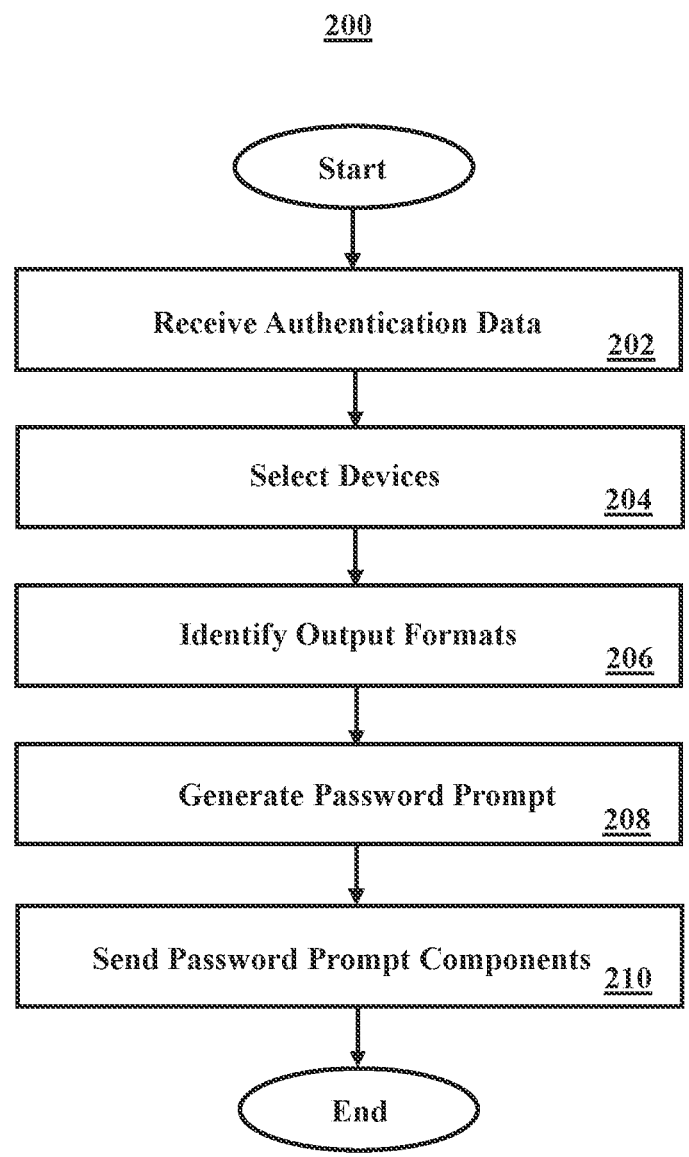
FIG. 2 is a flowchart of an exemplary method system for providing personalized password prompts, in accordance with aspects of the present disclosure.

Referring now to FIG. 2, illustrated is a flowchart of an exemplary method 200 for providing personalized password prompts using multiple devices, in accordance with embodiments of the present disclosure. In some embodiments, a processor of a system may perform the operations of the method 200. In some embodiments, method 200 begins at operation 202. At operation 202, the processor receives authentication data related to inputs of a user to authentication prompts. In some embodiments, method 200 proceeds to operation 204, where the processor selects devices from a set of registered devices to use for providing a first password prompt to the user. In some embodiments, method 200 proceeds to operation 206. At operation 206, the processor identifies one or more output formats for each of the selected devices. In some embodiments, method 200 proceeds to operation 208. At operation 208, the processor generates a first password prompt having two or more password prompt components, where each password prompt component has an output format. In some embodiments, method 200 proceeds to operation 210. At operation 210, the processor sends the two or more password prompt components to respective selected devices.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
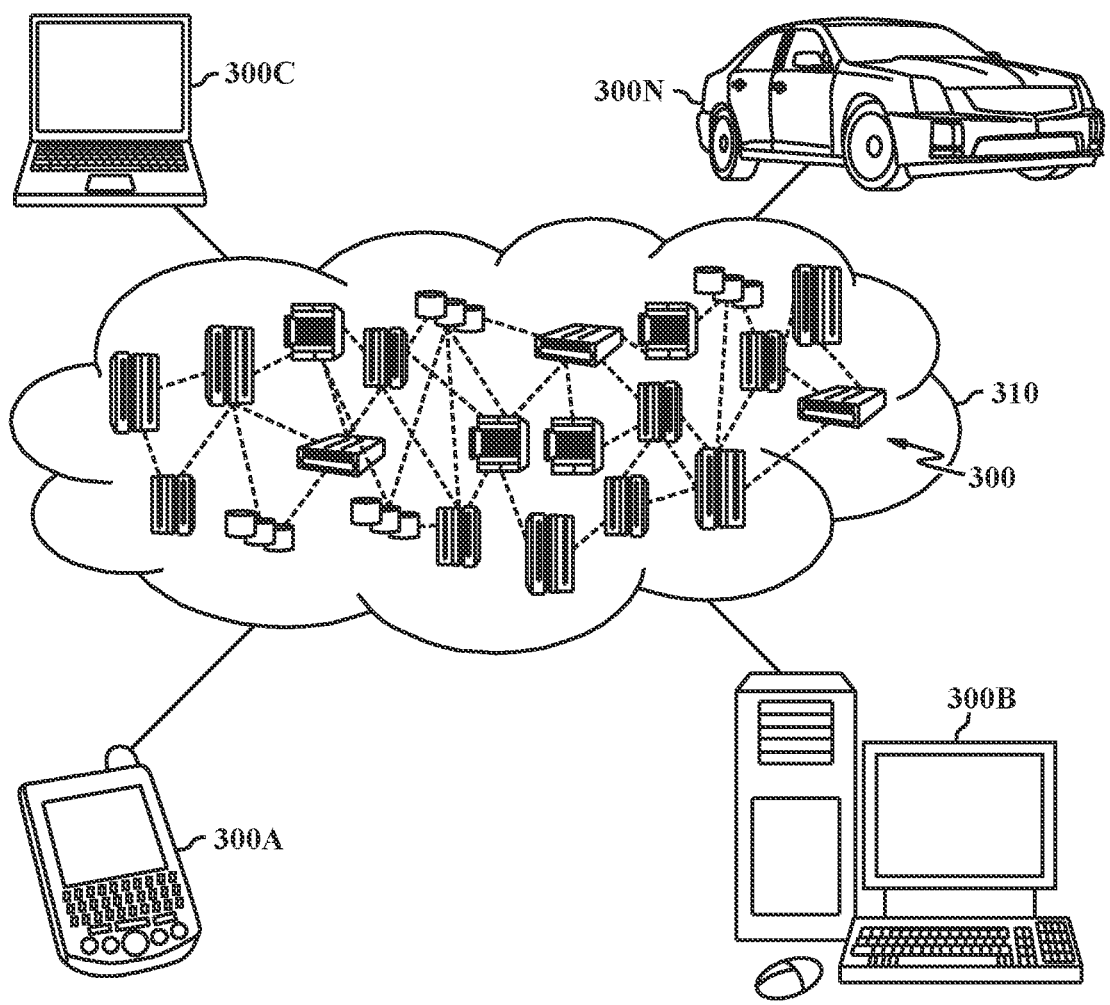
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
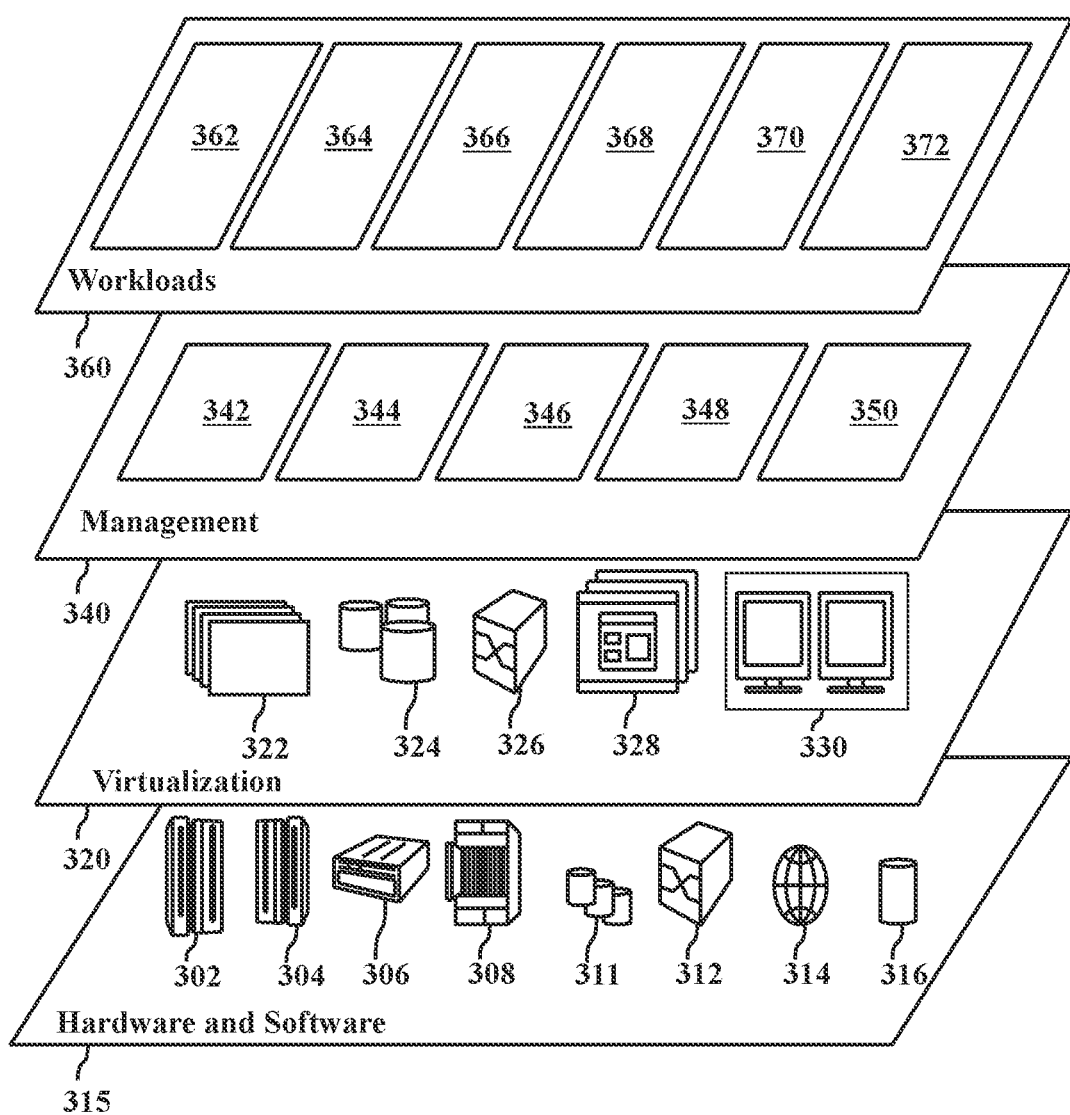
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and providing personalized password prompts using multiple devices 372.

Figure 4:
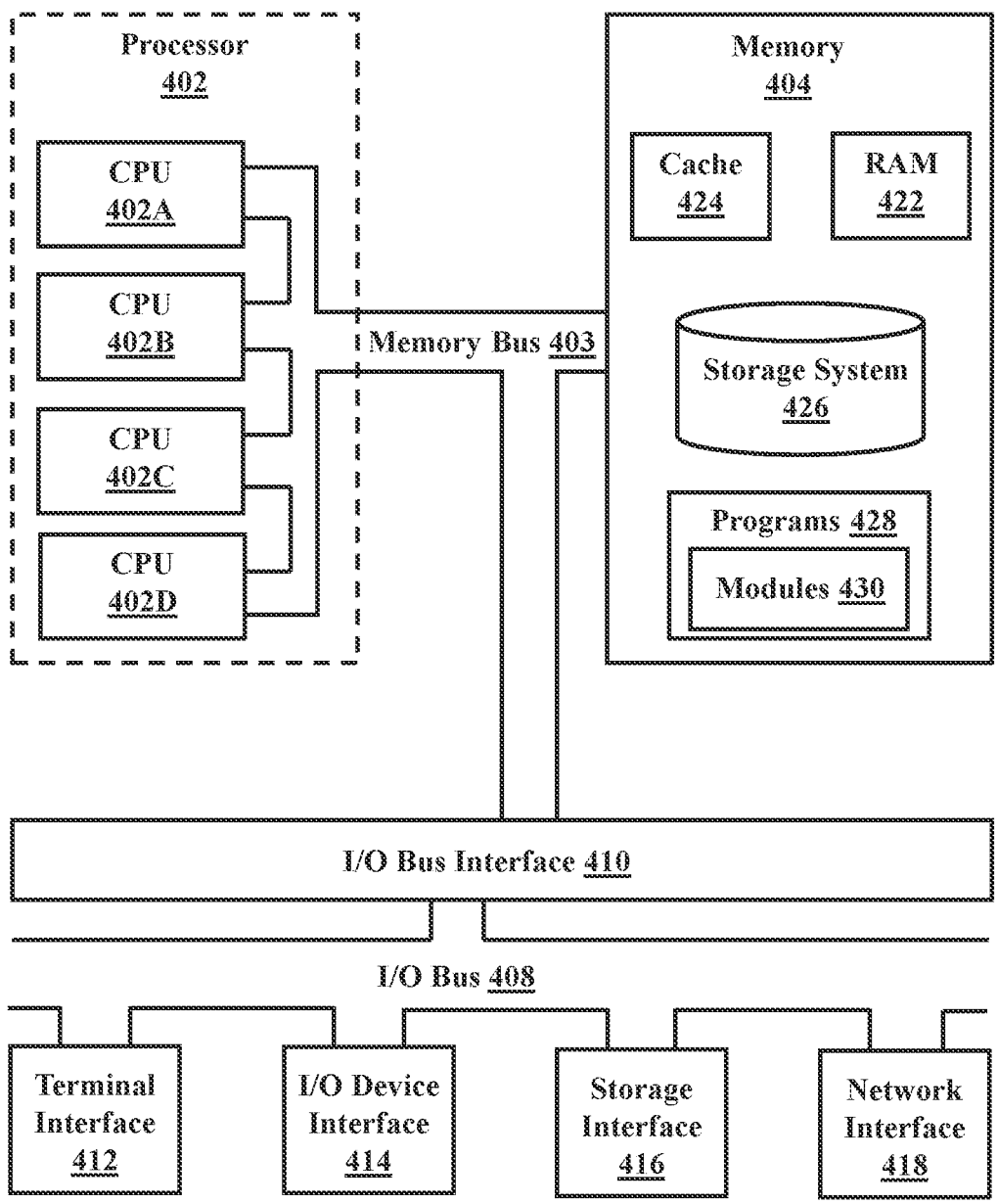
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
   receiving, by a processor, authentication data related to inputs of a user to predetermined authentication prompts;
   selecting, by the processor, devices from a set of registered devices to use for providing a first password prompt to the user;
   identifying, by the processor, one or more output formats for each of the selected devices;
   generating, by the processor, a first password prompt having two or more password prompt components; and sending a first password prompt component of the two or more password prompt components to a first device of the selected devices and a second password prompt component of the two or more password prompt components to a second device of the selected devices,
   wherein each of the two or more password prompt components has a unique output format,
   wherein each of the two or more password prompt components comprises a different portion of the first password prompt, and
   wherein a combination of the two or more password prompt components equals an entirety of the first password prompt.

2. The method of claim 1, further comprising:
receiving a first password response having two or more password response components; and
determining whether the first password response is valid, at least in part, based on whether each of the two or more password response components matches respective expected response components.

3. The method of claim 2, further comprising:
identifying that at least one of the two or more password response components does not match its respective expected response component;
determining a percentage of the two or more password response components that match their respective expected response components;
determining that the percentage exceeds a match threshold; generating one or more additional password prompt components; and
sending the one or more additional password prompt components to respective selected devices.

4. The method of claim 1, further comprising:
selecting devices to use for providing a second password prompt to the user;
determining one or more output formats for each of the selected devices;
generating a second password prompt having two or more second password prompt components, wherein the second password prompt has a security factor that differs from a security factor of the first password prompt; and
sending the two or more second password prompt components to their respective selected devices.

5. The method of claim 1, wherein at least one of the two or more password prompt components is generated based on usage data from one or more devices of the set of registered devices.

6. The method of claim 1, the method further comprising:
identifying that the first password prompt is being provided to the user for a heighted security transaction; and
generating the first password prompt to have an increased number of password prompt components.

7. A system comprising:
a memory; and
a processor in communication with the memory, the processor being configured to perform operations comprising:
   receiving authentication data related to inputs of a user to predetermined authentication prompts;
   selecting devices from a set of registered devices to use for providing a first password prompt to the user;
   identifying one or more output formats for each of the selected devices;
   generating a first password prompt having two or more password prompt components; and
   sending a first password prompt component of the two or more password prompt components to a first device of the selected devices and a second password prompt component of the two or more password prompt components to a second device of the selected devices,
      wherein each of the two or more password prompt components has a unique output format,
      wherein each of the two or more password prompt components comprises a different portion of the first password prompt, and
      wherein a combination of the two or more password prompt components equals an entirety of the first password prompt.

8. The system of claim 7, the processor being further configured to perform operations comprising:
receiving a first password response having two or more password response components; and
determining whether the first password response is valid, at least in part, based on whether each of the two or more password response components matches respective expected response components.

9. The system of claim 8, the processor being further configured to perform operations comprising:
identifying that at least one of the two or more password response components does not match its respective expected response component;
determining a percentage of the two or more password response components that match their respective expected response components;
determining that the percentage exceeds a match threshold; generating one or more additional password prompt components; and
sending the one or more additional password prompt components to respective selected devices.

10. The system of claim 7, the processor being further configured to perform operations comprising:
selecting devices to use for providing a second password prompt to the user;
determining one or more output formats for each of the selected devices;
generating a second password prompt having two or more second password prompt components, wherein the second password prompt has a security factor that differs from a security factor of the first password prompt; and
sending the two or more second password prompt components to their respective selected devices.

11. The system of claim 7, wherein at least one of the two or more password prompt components is generated based on usage data from one or more devices of the set of registered devices.

12. The system of claim 7, the processor being further configured to perform operations comprising:
identifying that the first password prompt is being provided to the user for a heighted security transaction; and
generating the first password prompt to have an increased number of password prompt components.

13. A computer program product comprising a computer readable storage medium having program instructions embodied therewith, the program instructions executable by a processor to cause the processor to perform operations, the operations comprising:
receiving authentication data related to inputs of a user to predetermined authentication prompts;
selecting devices from a set of registered devices to use for providing a first password prompt to the user;

identifying one or more output formats for each of the selected devices;

generating a first password prompt having two or more password prompt components; and sending a first password prompt component of the two or more password prompt components to a first device of the selected devices and a second password prompt component of the two or more password prompt components to a second device of the selected devices, wherein each of the two or more password prompt components has a unique output format, wherein each of the two or more password prompt components comprises a different portion of the first password prompt, and wherein a combination of the two or more password prompt components equals an entirety of the first password prompt.

14. The computer program product of claim 13, the processor being further configured to perform operations comprising:

receiving a first password response having two or more password response components; and determining whether the first password response is valid, at least in part, based on whether each of the two or more password response components matches respective expected response components.

15. The computer program product of claim 14, the processor being further configured to perform operations comprising:

identifying that at least one of the two or more password response components does not match its respective expected response component;

determining a percentage of the two or more password response components that match their respective expected response components;

determining that the percentage exceeds a match threshold; generating one or more additional password prompt components; and sending the one or more additional password prompt components to respective selected devices.

16. The computer program product of claim 13, the processor being further configured to perform operations comprising:

selecting devices to use for providing a second password prompt to the user;

determining one or more output formats for each of the selected devices;

generating a second password prompt having two or more second password prompt components, wherein the second password prompt has a security factor that differs from a security factor of the first password prompt; and sending the two or more second password prompt components to their respective selected devices.

17. The computer program product of claim 13, wherein at least one of the two or more password prompt components is generated based on usage data from one or more devices of the set of registered devices.

18. The computer program product of claim 13, the processor being further configured to perform operations comprising:

identifying that the first password prompt is being provided to the user for a heighted security transaction; and generating the first password prompt to have an increased number of password prompt components.

19. The method of claim 1, wherein the first password prompt component of the two or more password prompt components has an audio output format and the second password prompt component of the two or more password prompt components has a text output format.

20. The method of claim 1, wherein the first password prompt component of the two or more password prompt components comprises less than half of the first password prompt and the second password prompt component of the two or more password prompt components comprises more than half of the first password prompt.

* * * * *